No. 706,366. Patented Aug. 5, 1902.
A. VOGT & M. VON RECKLINGHAUSEN.
INTERNAL COMBUSTION MOTOR.
(Application filed June 25, 1901.)

(No Model.) 10 Sheets—Sheet 1.

No. 706,366. Patented Aug. 5, 1902.
A. VOGT & M. VON RECKLINGHAUSEN.
INTERNAL COMBUSTION MOTOR.
(Application filed June 25, 1901.)

(No Model.) 10 Sheets—Sheet 2.

No. 706,366. Patented Aug. 5, 1902.
A. VOGT & M. VON RECKLINGHAUSEN.
INTERNAL COMBUSTION MOTOR.
(Application filed June 25, 1901.)
(No Model.) 10 Sheets—Sheet 4.

No. 706,366. Patented Aug. 5, 1902.
A. VOGT & M. VON RECKLINGHAUSEN.
INTERNAL COMBUSTION MOTOR.
(Application filed June 25, 1901.)

(No Model.) 10 Sheets—Sheet 9.

Witnesses:
Inventors
Adolf Vogt
Max von Recklinghausen
by
Atty

THE NORRIS PETERS CO., PHOTO-LITHO., WASHINGTON, D. C.

No. 706,366. Patented Aug. 5, 1902.
A. VOGT & M. VON RECKLINGHAUSEN.
INTERNAL COMBUSTION MOTOR.
(Application filed June 25, 1901.)
(No Model.) 10 Sheets—Sheet 10.

UNITED STATES PATENT OFFICE.

ADOLF VOGT AND MAX VON RECKLINGHAUSEN, OF WESTMINSTER, LONDON, ENGLAND.

INTERNAL-COMBUSTION MOTOR.

SPECIFICATION forming part of Letters Patent No. 706,366, dated August 5, 1902.

Application filed June 25, 1901. Serial No. 66,008. (No model.)

*To all whom it may concern:*

Be it known that we, ADOLF VOGT, a citizen of Austria-Hungary, and MAX VON RECKLINGHAUSEN, a citizen of Germany, electricians, residing at No. 82 Victoria street, Westminster, in the county of London, England, have invented certain new and useful Improvements in Internal-Combustion Motors, (for which we have jointly made application for a patent in Great Britain, No. 23,684, dated December 27, 1900,) of which the following is a specification.

This invention relates to an internal-combustion motor which may be actuated by any kind of combustible, even such as is in the form of dust, and may be constructed of any desired size as a one-cylinder engine.

The motor may work with various cycles or strokes. It is adapted for any known method of ignition and is effectively cooled. To whatever extent it is charged it has always the same high compression-pressure, and the proportion between air and combustible is maintained constantly the same, so that a combustion as quick and energetic as possible is attained. Furthermore, the efficiency of the motor is regulated by changing the charge, the expansion at normal and small loads is brought to atmospheric pressure, and the heat is utilized to a large extent in the motor.

In this motor the open ends of the working cylinder are situated in separate chambers kept full of liquid, each of which chambers is in direct communication with a compression and explosion chamber placed above it and carrying the device for injecting the combustible and the compressed air, as well as the igniting device and the exhaust-valve and scavengering-valve. The working liquid and the compressed air are supplied to these devices by means of pumps or blowers driven by the motor. The compressions and explosions occur alternately in the two chambers confined by the liquid, whereby this liquid moves in the same direction as the working piston and acts itself as a piston. For controlling the compression for a given charge there is provided a cut-off device connected with the pipes which lead away the liquid from the two compression-chambers. This device is actuated by the valve-motion, and when the charge is increased a corresponding quantity of liquid is withdrawn from the compression-chambers.

Before entering into a detailed description of the improved motor it is necessary for the proper comprehension of the novel features thereof to demonstrate shortly the method of operating on which they are based and their interdependence for attaining the result sought for.

The main object of this invention is to obtain an internal-combustion motor that shall work with a maximum efficiency and economy, in particular when subject to its normal load, which as a rule amounts to from fifty to seventy-five per cent. of the full load. This end can only be attained by the coördination of several features, each of which is essential to the result sought for. These features may be broadly stated as follows:

First. As the loss of useful effect through friction of the moving parts is constant whether the motor is working at full or at partial load, it is essential to reduce such friction to a minimum. This is effected according to this invention by immersing the piston in water, with which the cylinder is charged and which constitutes liquid extensions of the piston on each side thereof, whereby the working parts are protected against the excessive heat of the explosions, the heat of such parts is more uniformly distributed, preventing unequal expansion, and the friction of the moving parts, stuffing-boxes, &c., is reduced to a minimum. Also losses through leakage of the combustion-gases past the piston and through the stuffing-boxes are prevented.

Second. The economical working of the motor is mainly dependent upon the degree to which the heat produced is utilized—that is to say, the expansion of the combustion-gases should be carried to a maximum, as should also the degree of compression of the charges, and this compression should be constant whether the motor is working with a large or a small load. Also, for insuring a maximum efficiency of the motor, it is essential that the regulation of the power developed should be effected not by varying the proportions of the explosive charges, but by varying their volume. These conditions we fulfil, first, by so regulating the action of the explosive charges that the expansion is carried to atmospheric pressure; secondly, by so regulating the explosive charges that the degree of filling is made to vary in proportion to the variation of the load on the motor; thirdly, for maintaining the same high degree of compression of the charges, whether these be large or small, the volume of liquid in the vertical extensions with which the ends of the cylinder are provided is varied in proportion to the variation in the load, whereby the height to which the liquid rises during the compression-stroke, and consequently the space in which the completely-compressed charge is contained, are varied in a corresponding manner; fourthly, provision is made for the introduction of a quantity of fresh liquid at each stroke and the discharge of a certain quantity of the liquid from the cylinder during the compression-stroke when the pressure exceeds a predetermined amount in order to effect the proper cooling of the engine without a cooling-jacket, to make good any losses by evaporation or leakage, and to maintain the degree of compression of the charges constant; fifthly, the vertical extensions of the working cylinder have their upper ends made conical or tapering in order that the spaces of variable capacity containing the compressed charges may always be of similar configuration, whereby the extent of cylinder-surface inclosing such space is practically always proportionate to the volume of the charge, thus obviating the great loss of heat by conduction on the explosion of the charge, which occurs in the case of a cylinder and piston of ordinary construction, owing to the extent of conducting-surface inclosing the compression-space being enormously increased in proportion when the volume of such space is reduced for containing a reduced charge.

Lastly, in order to be enabled to work with variable explosive charges, means are provided for controlling the discharge-valve, so as only to close when the volume of air forced into the cylinder after the explosion corresponds to that required for the next combustible charge, the governor being also made to control the supply of combustible to the said charge of air, so that this is always introduced directly after the closing of the discharge-valve, whether this takes place sooner or later, and so that the amount of combustible admitted varies according to the required increase or decrease of the explosive charge.

In the accompanying drawings is shown as an example of this invention a one-stroke-cycle internal-combustion motor working with coal-dust.

The motor consists, as shown in Figs. 1 to 6, of a cylinder 1, open at both ends, in which a piston 2 reciprocates. The piston-rod 3 is connected on one side in the usual manner with the crank-shaft and fly-wheel and is extended on the other side, where it is connected with a blower 4, which supplies the scavengering-air. The cylinder is situated in two chambers 5 5, separated from each other and kept full of liquid. These chambers are closed at the top by conical explosion-chambers 6 6. The liquid which is the intermediary between the piston and the explosion-chambers extends in these latter up to the level $x$ $x$, Fig. 5, and, moving together with the piston, constitutes a continuation of this. Opening out of the side of each explosion-chamber is a pipe 7, which communicates with the pipe 8, leading from the blower 4, and contains a valve 9, Figs. 4 and 6, which is opened when the scavengering-air is to be admitted to the explosion-chamber to expel the products of combustion. In the head 10 of the explosion-chamber are the exhaust-valve 11, Figs. 5 and 6, and the distributer 12 of the fuel-injecting device. Behind the chamber 5 is situated the rotary valve 13, Figs. 4, 6, 13, 14, which is actuated by the valve-motion. This serves for regulating the compression to correspond with the charge and is provided with a valve 14, which according to the position of the rotary valve is always in communication through one of the pipes 15 with the compression side of the working cylinder. An eccentric 16 on the crank-shaft drives the pumps 17 17 18 18 19, Fig. 2, while the valve-motion shaft 20, which rotates at the same speed as the crank-shaft, drives the governor 21. The pumps 17 17 and 19 supply the compressed air. The two former are in communication through pipe 22, Figs. 2, 5, 6, 7, 9, 10, with the injecting apparatus, while the latter communicates by pipe 23, Figs. 2, 3, 15, 16, through the starting-valve with the explosion-chamber. The pumps 18 18 are for forcing liquid into the cylinder-chambers, with which they communicate, respectively, through pipes 24, Figs. 2, 5, 6, 7.

Figure 6:
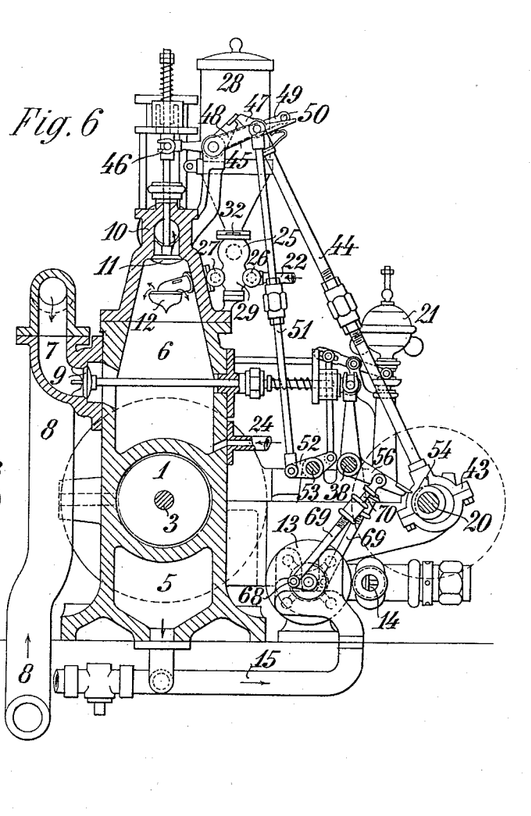
Figures 7, 8, 9, 10:
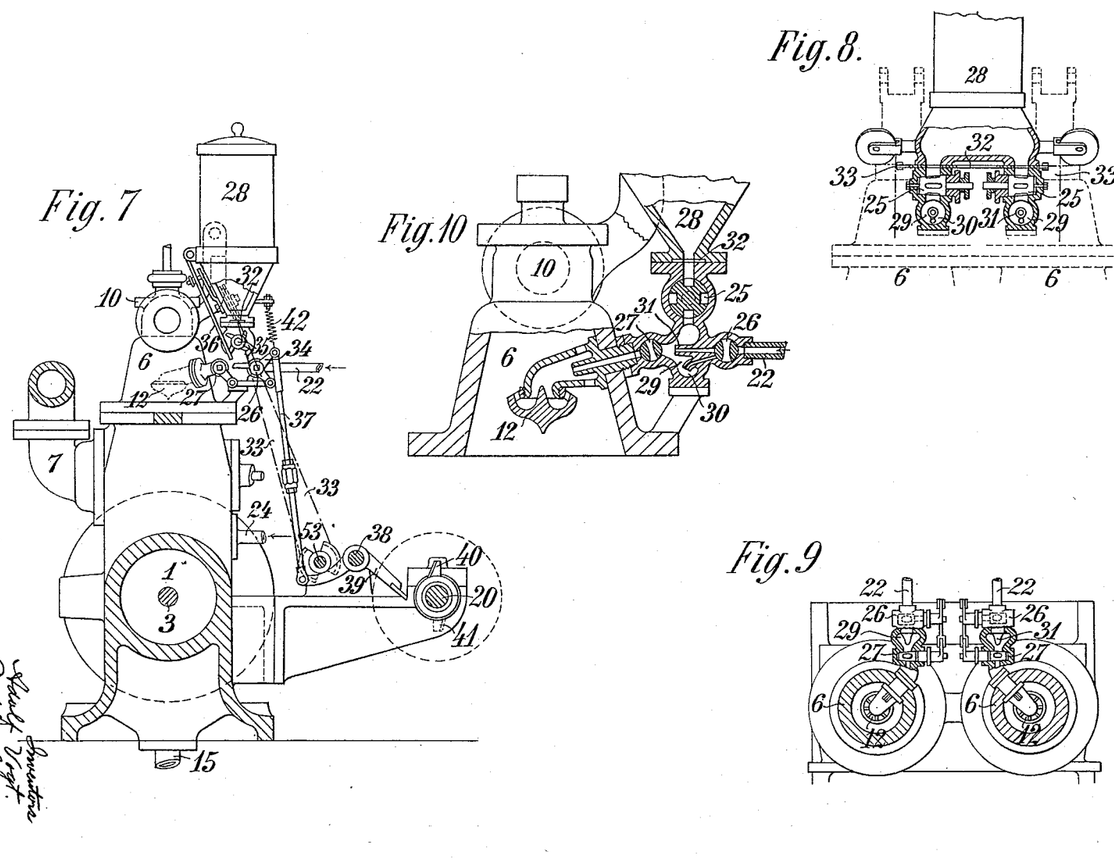
Fig. 7 is a sectional elevation of one of the compression or explosion chambers and the apparatus for injecting the fuel and air.
Figs. 8 and 9 are vertical and horizontal sections, respectively, of the two fuel and air injecting apparatus.
Fig. 10 shows one of these two apparatus in vertical section drawn to an enlarged scale.

The injecting apparatus of each explosion-chamber, Figs. 5 to 10, consists of a cylindrical feed-valve 25, Fig. 10, two cocks 26 27, a coal-dust hopper 28, a mixing-chamber 29, and a distributer 12. The fuel introduced by the intermittent rotation of the feed-valve 25 into the chamber 29 is blown up into a dust cloud by the compressed air issuing from pipe 22 through jet 30 and is then injected into the explosion-chamber by the air issuing from the nozzle 31. This injecting apparatus is actuated by the valve-motion shaft and is controlled by the governor in such manner that the quantity of coal-dust constituting a charge is blown into the appropriate explosion-chamber directly after the exhaust-valve 11 has closed. The quantity of fuel delivered by each of the feed-valves 25 is controlled according to the magnitude of the charge necessary for the motor by the governor. For this purpose a thin steel band 32, having slots in it, is reciprocated between the hopper 28 and the feed-valves by means of cords 33, passing over pulleys, so that the quantity of fuel admitted into the feed-valves corresponds with the charge required. Each feed-valve receives an intermittent rotation from a three-armed lever 34, Fig. 7. One of these three arms strikes against the star-wheel 35, fixed on the axis of the feed-valve. An adjusting-rod 36, urged by a spring, insures the correct position of this star-wheel for engagement with this lever-arm. The second arm of the lever 34 turns the cock 26 and through a link the cock 27. Cock 26 opens first the jet 30 and then the nozzle 31 to the air-pipe 22, while cock 27 lets the mixture of air and coal-dust enter the distributer 12. The third arm of lever 34 is moved, through rod 37 and bell-crank 39, free to turn on shaft 38, by tappet 40 or 41 on the valve-motion shaft 20, against the force of the tension-spring 42. Thus after the injecting device has been actuated by the downward motion of the rod 37 it is brought back to rest by the spring 42. The compressed air is supplied either by the pumps 17 17, one of which is connected with each cock 26 through pipe 22, or by the pump 19, which if the pumps 17 supply the injecting-air supplies compressed air for starting the motor.

Figure 1:
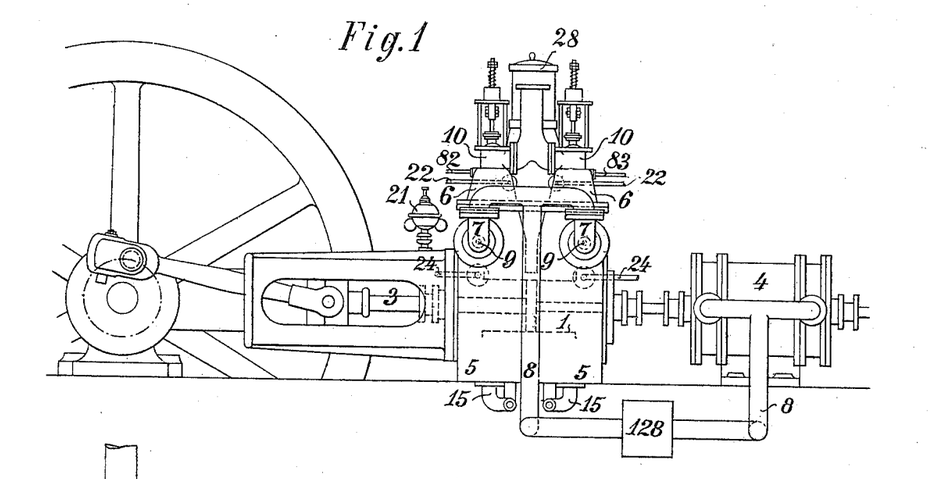
Figure 1 is a side elevation, and Fig. 2 a plan, of the motor.
Figure 2:
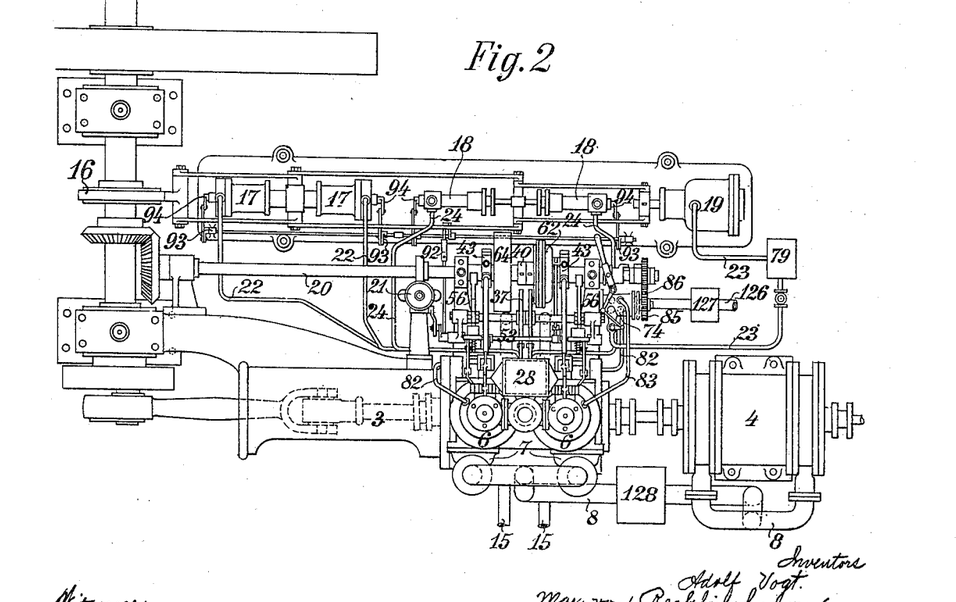
Figure 3:
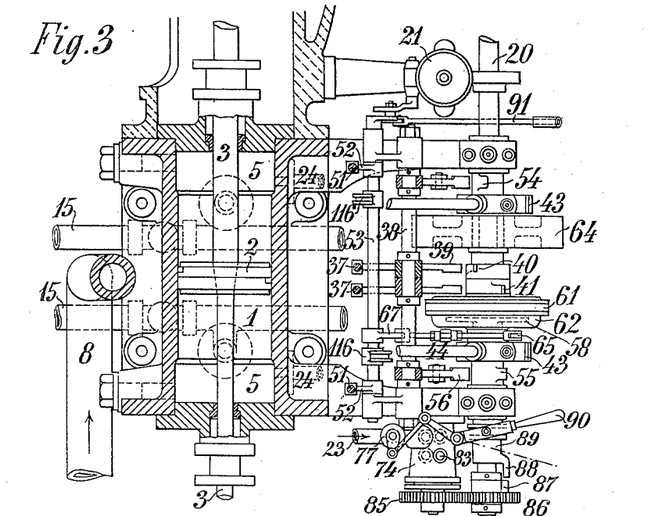
Fig. 3 is a plan, partly in section, of the valve-motion, with a horizontal section of the working cylinder.
Figure 4:
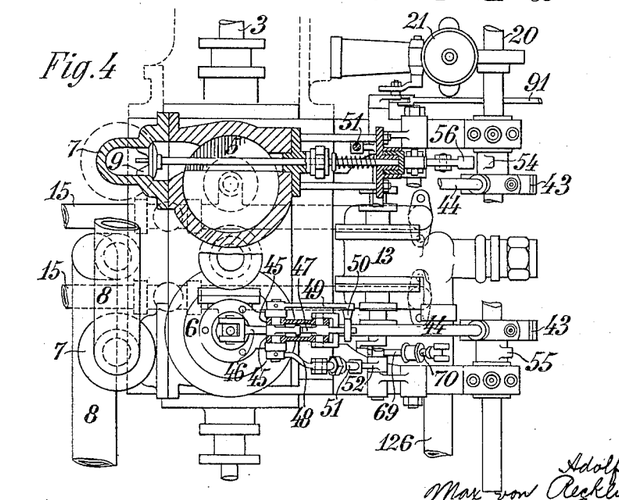
Fig. 4 shows, partly in plan and partly in horizontal section, the valve-motion for the exhaust and blow-off valves.
Figure 5:
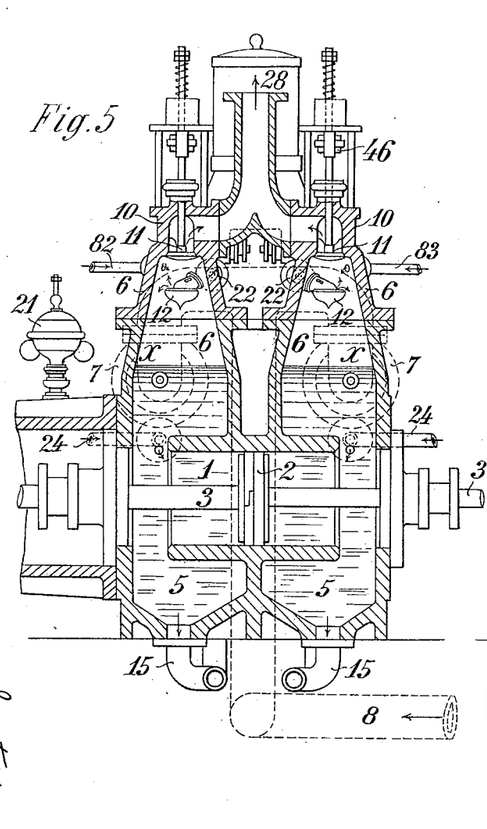
Figs. 5 and 6 are vertical sections, at right angles to each other, of the working cylinder and the compression or explosion chambers.

The exhaust-valve 11 of each explosion-chamber is actuated by an eccentric 43 on the valve-motion shaft 20 and is controlled by the governor, as follows: The eccentric-rod 44, Figs. 3, 4, and 6, is connected with the two levers 45, Fig. 4, on whose axis the lever 46, one arm of which moves the exhaust-valve, is free to turn. The other arm of this lever 46 is supported by a nose 47, which is urged by a spring and is pivoted between and on the levers 45. On the turning axis of the levers 45, one on each side of these, are keyed the levers 48 and 49, Fig. 6, the latter of which carries a horizontal pin 50, while the former is connected through rod 51 and lever 52 with the shaft 53, rocked by the governor. The movement of the eccentric-rod 44 raises the axis of the nose 47 and depresses the other end of the lever 46, opening the exhaust-valve. After a period determined by the governor the tail of the nose 47 strikes against the pin 50 and, being turned thereby, is disengaged from the lever 46, so that the exhaust-valve is closed by its spring. This latter movement occurs sooner or later, according to the position of the pin 50—that is to say, when the charge is smaller or greater— and in this way, since the valve is always opened at the same time, great precision of valve control is achieved. While the exhaust-valve is open the combustion products are being swept out, for which purpose a scavengering charge of air is blown through the valve 9.

Figure 13:
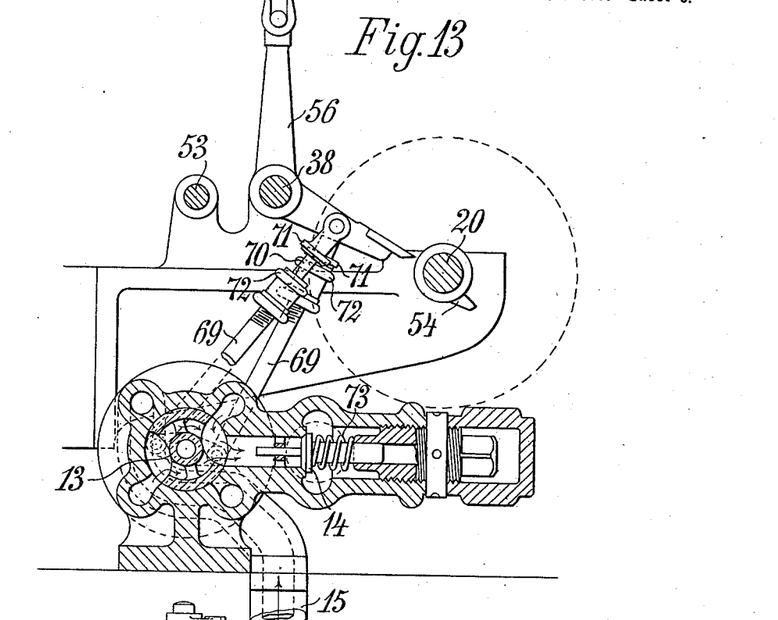
Figs. 13 and 14 are vertical and horizontal sections, respectively, of the rotary valve apparatus, which regulates the compression by withdrawing water.

As shown in Fig. 6, the valve 9 is opened by the valve-motion shaft 20, on which are two tappets, Figs. 4, 6, and 13. Each of these tappets, shortly before the end of the stroke, actuates the corresponding bell-crank lever 56, which engages with the spindle of the valve 9 and opens the latter to admit air from the blower 4 into the explosion-chamber until the tappet 54 is free of the lever 56 and valve 9 has been closed by its spring.

In order that the fuel-injecting mechanism may be actuated immediately after the exhaust-valve has been closed, a regulating device is provided on the valve-motion shaft 20 and is controlled by the governor 21, Figs. 2, 3, 11, and 12. This consists of a toothed wheel 57, keyed to the valve-motion shaft and in gear with pinions 59, carried by the lever 58. These pinions are in one with toothed wheels 60, which in their turn engage with the circular rack 61. This latter is fixed to a casing 62, which is free to revolve independently of lever 58 and is fixed to a sleeve 63, on which are the tappets 40 and 41 and a fly-wheel 64. To the boss of lever 58, which extends through the casing 62, is attached a lever 65, connected through rod 66 and lever 67 with the shaft 53, rocked by the governor. On shaft 38 are the bell-cranks 39, free to turn, as already described, on one side connected with the rods 37, which actuate the injecting mechanism, and on the other side extending into the paths of tappets 40 41. When the shaft 20 rotates, the lever 58 being held stationary by the governor, the toothed-wheel gearing is set in motion, and with it the sleeve 63 and the tappets 40 41. If now the shaft 53 is rocked by the governor in the direction of the arrow, Fig. 11, the lever 65 is moved in the opposite direction, whereby the tappets 40 and 41 are moved backward through an angle twice that through which lever 65 has moved. Thus the tappets 40 41 engage later with their respective levers 39, and the fuel injection also occurs later.

Figure 14:
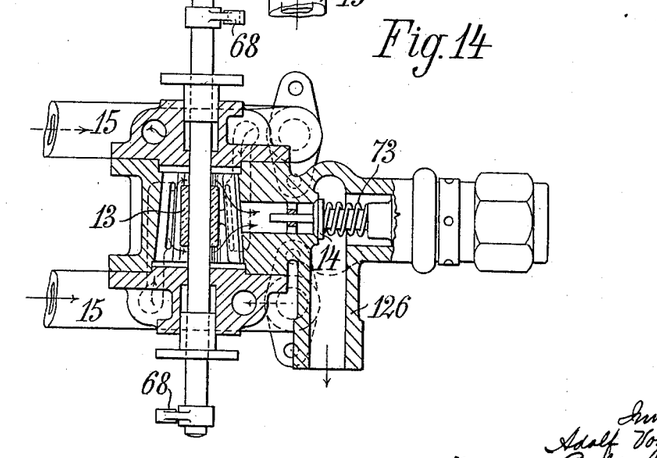

The balanced rotary valve 13, Figs. 13 and 14, which regulates the compression, so that it corresponds with the charge, is controlled by the scavengering valve-motion in such manner that its valve 14 is always in communication with that side of the cylinder on which there is compression. The rotary valve has in its casing four slits, of which the two opposite each other are in communication each through one of the hollow spaces of the casing-cover of the valve. The hollow spaces of the cover are in communication with the pipes 15. According to the position of the valve, one or other pair of the slits is opened, and the corresponding side of the working cylinder is opened to the valve 14. The movement of the rotary valve is effected by the levers 56, which open the scavengering-valves 9, and are themselves actuated by the tappets 54 55 on the valve-motion shaft 20. For this purpose there are two cranks 68 on the axis of the rotary valve, Fig. 14, which are connected by the hollow rods 69 with the levers 56. The rods 70 can slide in the hollow rods 69 until their collars 71 strike against collars 72 of rods 69. Suppose that the hinder lever 56 is put in action. The corresponding rod 69 is pushed downward, the collars 71 and 72 being in contact. The rotary valve is thus put into that position in which those two slits are opened which effect communication between valve 14 and, say, the forward side of the cylinder. The other rod 69 is raised by this movement and its collar 72 brought in contact with collar 71 on the corresponding rod 70, so that when the forward lever 56 is actuated the rotary valve will be brought back to the position shown. Compression is then beginning on the hinder side of the cylinder. If now the chamber in question contains more liquid than is necessary for the desired compression, the following will occur: As soon as the compression-pressure exceeds that of spring 73 on valve 14 liquid is pushed through this valve until shortly before the end of the stroke the rotary valve is turned and this side of the cylinder is cut off from the valve 14. As the complete closure of the rotary-valve slits occurs shortly before the dead-point, the compression-pressure does not increase to any marked extent. The degree of compression may be accurately adjusted during working by varying the tension of the spring 73.

Figure 15:
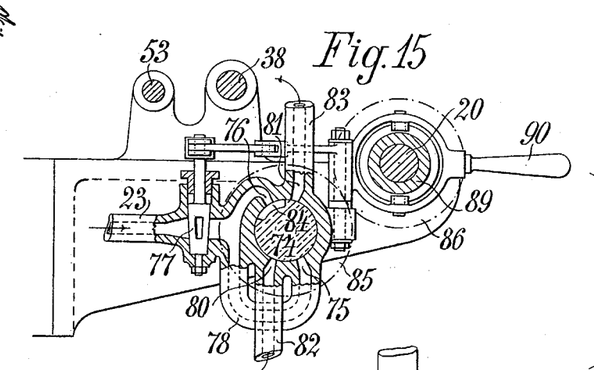
Figs. 15 and 16 are vertical and horizontal sections, respectively, of the starting mechanism.
Figure 16:
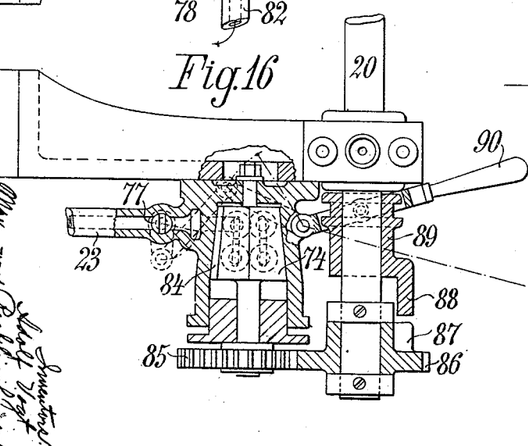

The motor is started by compressed air admitted alternately into the one and the other explosion-chamber. For this purpose the starting-valve mechanism shown in vertical and horizontal section, respectively, in Figs. 15 and 16 is used. This consists of a balanced three-way cock 74, the casing of which has four passages in opposite pairs. Passages 75 and 76 are merged into a common duct 78, which forks from pipe 23 and is capable of being cut off therefrom by cock 77. Pipe 23 supplies duct 78 with compressed air from the compresed-air holder 79, itself fed from pump 19, Fig. 2. The other two passages 80 81 open, respectively, into pipes 82 83, leading to the two explosion-chambers 6, respectively, Figs. 1, 2, and 5. In the surface of the plug of the cock 74 is a channel 84, and the plug carries a toothed wheel 85, gearing with a second toothed wheel 86, free to turn on the valve-motion shaft 20. On the boss of this wheel 86 is a projection 87, with which the arm 88 of a sliding sleeve 89 on the shaft 20 engages when the said sleeve is moved toward the wheel by the lever 90. By this movement of the lever 90 not only is the arm 88 brought into position for engaging with the projection 87, but the cock 77 is opened and the three-way cock 74 is also opened by a revolution of the shaft 20. As a result compressed air from the reservoir passes through the channel 84 and one or other of the pipes 82 83 to the corresponding explosion-chamber. If the motor is to be worked with propulsion at each stroke, as is to be recommended, in order that for a given efficiency the smallest possible cylinder dimensions and a uniform running may be obtained, the highest possible compression remaining the same at different charges and loads is used for achieving a correspondingly-high thermal efficiency. The compression-spaces are so constructed that they diminish from below upward. The liquid which serves as intermediary between the explosion-chamber and the piston lengthens the latter up to the spring of the coned explosion-chambers and prevents the cylinder-walls and piston-surfaces from being strongly attacked when fuel in the form of dust is used, for the ashes, in so far as they are not blown out, cannot settle and burn on the cylinder-walls swept by the piston, but are received by the liquid, which is continuously renewed while the motor is at work. This renewal of the liquid is effected by the pumps through the rotary valve, which is turned by the valve motion in such a position that its valve 14 is always in communication with that side of the cylinder on which there is compression. Shortly before the dead-point this position is reversed and the communication is with the other side of the cylinder. The degree of compression therefore is every time regulated by this valve 14, as in the same proportion as the pumps supply liquid this must be discharged through the valve. Only during the short time that the motor is to work with a diminished charge is it necessary in order to make the compression-space smaller and obtain the same compression to make the liquid piston somewhat longer, and then no liquid is expelled. The motor thus maintains the compression-pressure at the same degree and the same in both chambers for all charges by automatically diminishing the compression-space. Moreover, the proportions of the compression-space remain always nearly the same, since its diameter diminishes from below upward, and in this manner for a given compression-volume there is always the smallest possible surface. As during the combustion the heat imparted to the walls of the chamber is as small as possible, the theoretical temperature of combustion is approached as nearly as possible. If when the load diminishes the charge becomes smaller, the volumetric efficiency of the pumps is also correspondingly diminished by the throttling of the intakes by the regulator. The diminution of pressure thus engendered becomes, however, again effective in the compression, so that no great loss of work follows the throttling. As the work of compression is directly proportional to the load, the mechanical efficiency of the motor is nearly always the same.

Figure 17:
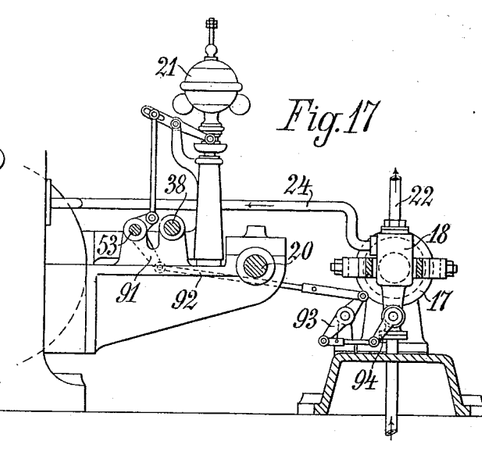
Fig. 17 shows in elevation one of the pumps with its throttle actuated by the governor.

When using pulverulent fuel (coal-dust) the motor works as follows: For starting, the crank is placed about twenty degrees over the dead-point on the instroke and the starting-gear lever is turned so as to admit compressed air into the motor. The latter starts at once and runs as a double-acting compressed-air motor until the first explosion. The pumps come into action. On the other side of the piston an explosive mixture is injected, compressed, and fired at the dead-point. As soon as the explosion occurs the starting-lever is moved back and the two cocks on the starting-gear thus closed again. The motor now runs at its maximum charge until the normal number of revolutions has been reached. The governor then rises and therewith the pin 50, so that the exhaust-valve remains open for a longer time. The band 32 is also shifted by the governor and the supply of fuel correspondingly diminished. At the same time the mechanism which actuates the injecting apparatus is so moved that the injection occurs later, and by a system of levers 91 92 93 94, Figs. 2 and 17, also controlled by the governor, the intakes of the pumps are throttled and the delivery of the latter correspondingly diminished. The governor continues to rise until the charge is appropriate to the load on the motor.

Figure 18:
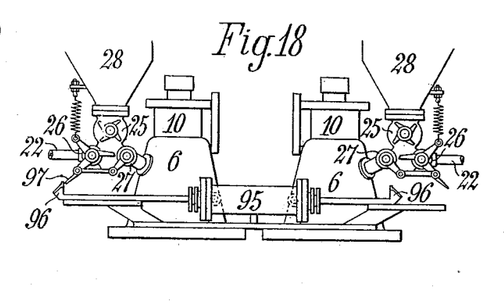
Fig. 18 is a side elevation of an automatic control for the injecting apparatus.

The injecting mechanism and the feed-valve for the fuel may also be governed automatically by the compression-pressure prevailing alternately in the two explosion-chambers. Such an arrangement is shown in Fig. 18. It consists of a piston in a small cylinder 95, the rod of which extends in both directions and carries at its ends hooks 96. These hooks engage with extensions 97 of the levers which move the cocks 26 and 27. The cylinder 95 is in communication on both sides of the piston with the corresponding explosion-chamber, respectively, and the pressure on the piston is always the difference between the compression-pressure in the one chamber and the expansion-pressure in the other. As soon as the former pressure is greater than the latter the piston moves in the corresponding direction, and its rod actuates the injecting mechanism on that side, by which time the exhaust-valve 11 must obviously be closed. When the compression-pressure in the other chamber is in excess, the small piston is moved in the opposite direction and the second injecting mechanism is brought into play.

Figure 11:
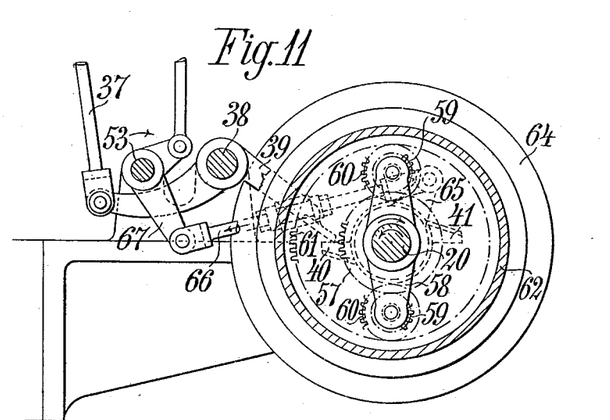
Figs. 11 and 12 are sections at right angles to each other of a mechanism for regulating the injection of fuel and air.
Figure 12:
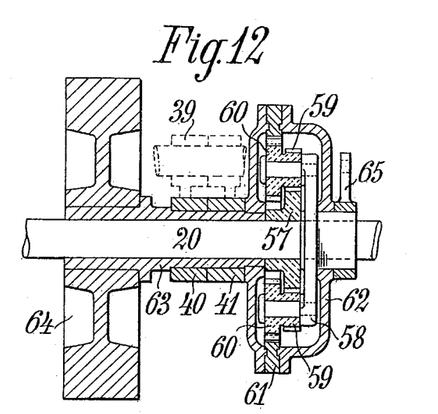
Figures 19, 20:
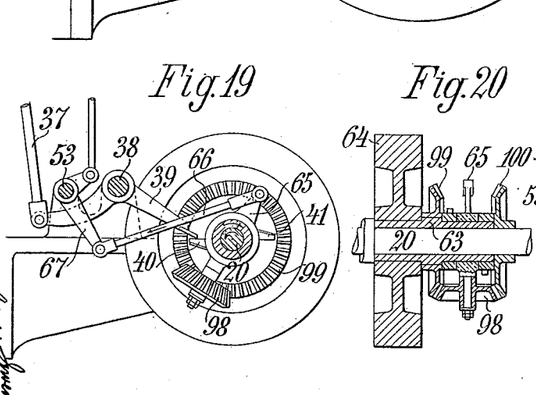
Figs. 19 and 20, 21 and 22 show two modifications, in end view and longitudinal section, respectively, of the regulating device for the fuel and air injecting apparatus.
Figure 21:
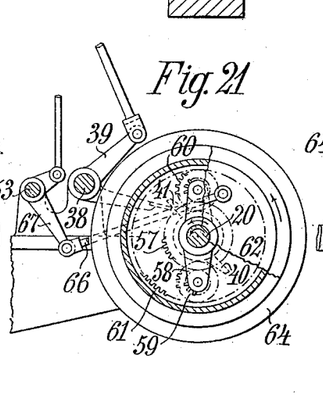
Figure 22:
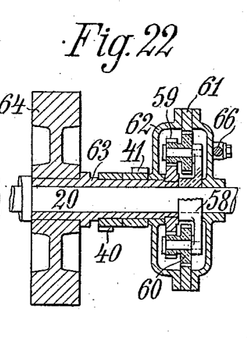

The regulating mechanism for the injecting apparatus may be provided with bevel-wheels 98, 99, and 100, as shown in Figs. 19 and 20, instead of with spur-wheels, as in Figs. 11 and 12. The action is the same as in the arrangement previously described. This regulating mechanism can also be constructed so that the tappets 40 41 move in the same direction as the valve-motion shaft, but at double the speed, as is indicated in Figs. 21 and 22. Here the lever 58 is keyed to the shaft 20 and the toothed wheel 57 with the sleeve 63. The casing 62 is connected by the rod 66 and the lever 67 with the shaft 53. When the governor shifts the casing 62 in the direction indicated by the arrow, the tappets are moved backward with respect to their former position, and the injection occurs later.

Figures 23, 24, 25, 26, 27:
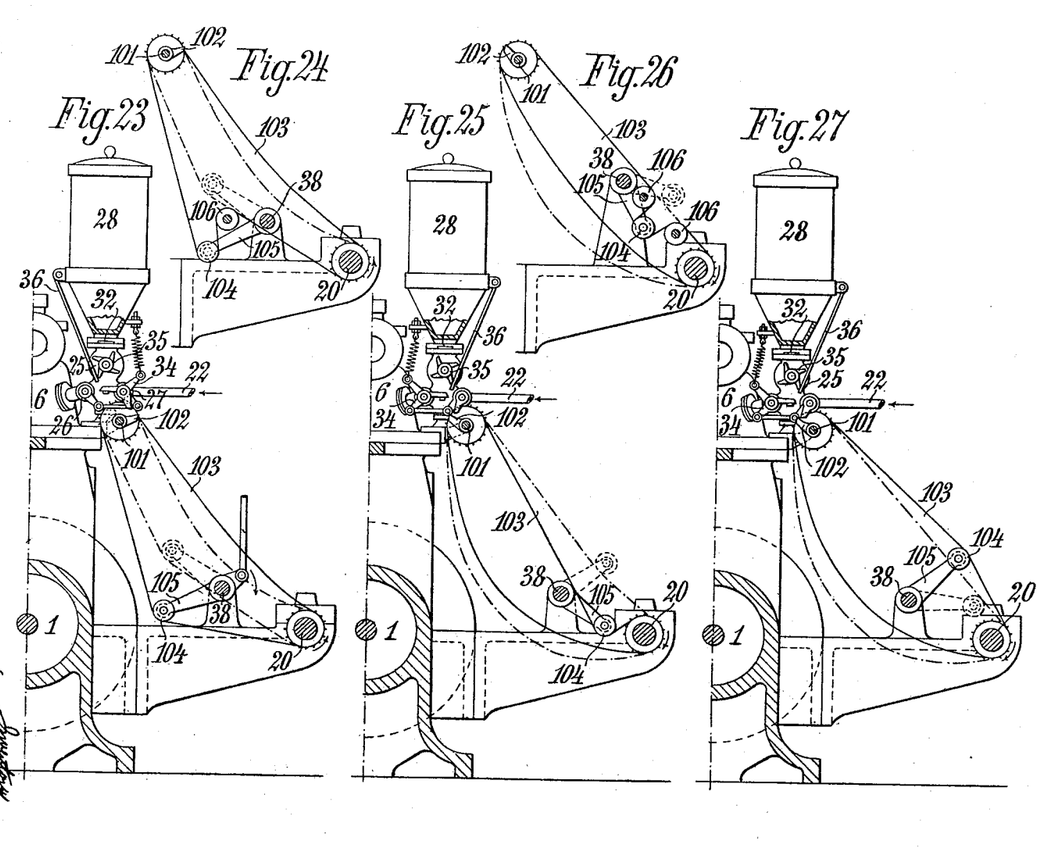
Figs. 23 to 27, inclusive, are sectional elevations of modifications of the mechanism for actuating the fuel and air injecting apparatus.
Figure 28:
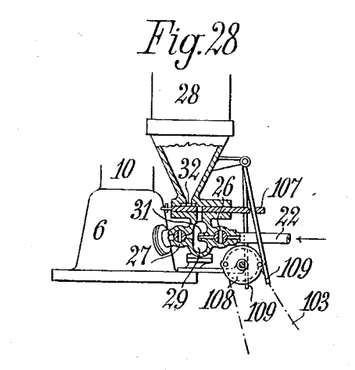
Figs. 28 to 30, 31 to 33, and 34, 35 show modifications of the fuel-supply apparatus.
Figure 29:
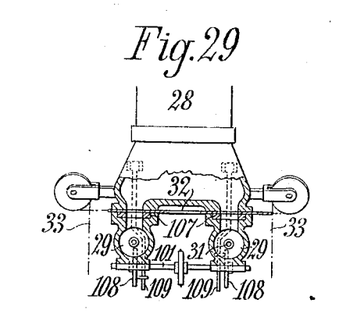
Figure 30:
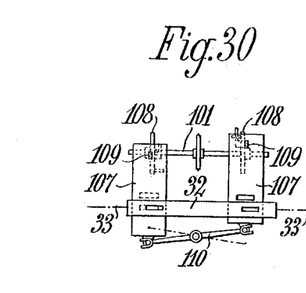
Figures 31, 32, 33:
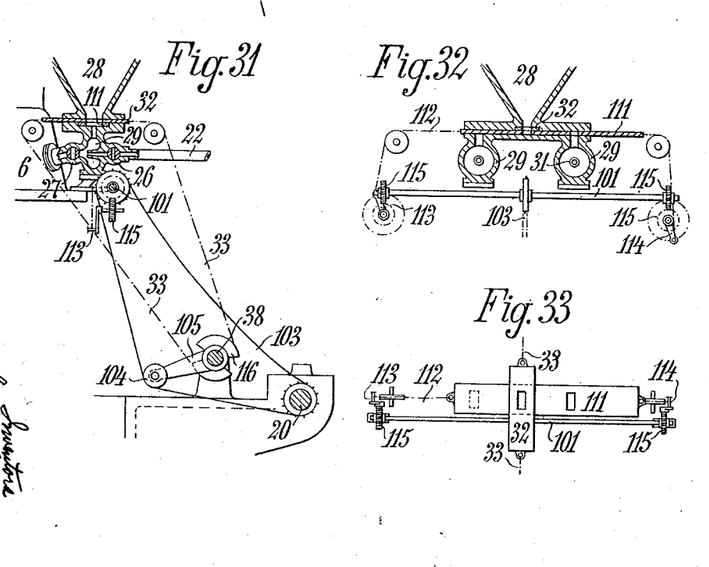
Figure 34:
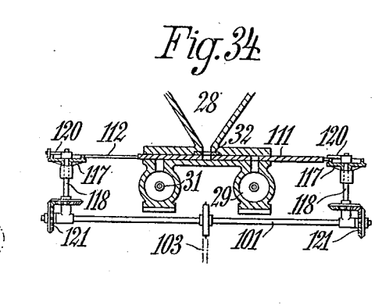
Figure 35:
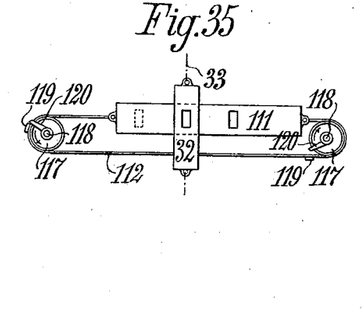

The mechanism for injecting the fuel shortly after the closure of the exhaust-valve may also be such as is shown in Figs. 23 to 27, inclusive. In Fig. 23 is shown a shaft 101, mounted below the injecting mechanism and carrying a tappet 102 for each injector. This shaft is driven by a chain 103 from the valve-motion shaft 20. Normally this chain is held in the position shown in full lines by the roller 104, pivoted on an arm 105, mounted on the shaft 38. When shaft 38 is turned by the governor in the direction indicated by the arrow, the arm 105 and the chain assume the position shown in broken lines. The slackening of the chain checks the upper chain-wheel, and the injection occurs later. In Fig. 24 the chain passes over a fixed roller 106, whereby the chain is tightened or slackened nearly proportionally to the angular movement of the arm 105. Figs. 25, 26, 27 show modifications which differ from the two just described only in the arrangement of the roller 104 with respect to the chain. In Fig. 26 there are two guide-rollers 106, between which the roller 104 moves for the purpose of tightening or loosening the chain.

In the modifications just referred to, Figs. 23 to 27, the parts for actuating the rod 51, the exhaust-valve motion, and the driving-bands for the band 32 of the fuel-hopper are arranged on shaft 38 instead of on shaft 53, and the former is controlled by the governor, so that shaft 53 may be omitted. In the course of its rotation the tappet 102 moves the three-armed lever 34 and opens the cocks 26 and 27 coupled thereto. At the same time one of the arms of this lever is brought over a tooth of the star-wheel 35, which it turns in its return, and thus the fuel-feed valve 25 is actuated as it is by the rod 37 in Fig. 7.

Instead of the valve arrangement for feeding the fuel shown in Figs. 7 to 10 there may be used one of the devices shown in Figs. 28 to 30, 31 to 33, and 34 and 35, respectively. The first of these, Figs. 28 to 30, consists of two flat sides 107, each dependent on a disk 108 on the shaft 101 in the following manner. When the disk is revolved by chain 103 from the valve-motion shaft, a pin projecting from its face engages with and lifts the lever-arm 109, which passes through a hole in slide 107. The two slides are connected by a lever 110, and the pins on the disks are at an angle of one hundred and eighty degrees to each other, so that the slides are alternately pulled out. In its inward position the slide presents a slot in it beneath the opening of the fuel-hopper 28, so that the slot is filled with coal-dust, which is discharged into the injecting apparatus when the slot comes over the opening thereof in its outward position. By a slotted steel band 32, controlled by the governor, as already described, the slots in the slides can be more or less covered to regulate the charge of fuel admitted to the injecting apparatus. The second device, Figs. 31 to 33, consists of a slide 111, having two slots brought alternately beneath the hopper-opening to be charged with fuel and over the opening of the corresponding injecting apparatus to discharge the fuel. The slide is reciprocated by steel cords 112, which pass over rollers and are attached to cranks 113 114, which are driven by skew-gear 115 from shaft 101, itself driven by chain 103. The charging in this device is regulated by band 32, moved at right angles to slide 111 by chains or cords 33, connected with segments 116 on the shaft 38, which is rocked by the governor. The third device, Figs. 34 to 35, also has only one slide 111, which to insure filling and discharge is made to pause at the end of its stroke. For this purpose a steel band 112, passing over guide-rollers 117 free to turn on arbors 118, is attached to slide 111 and carries projections 119. These are alternately engaged by tappets 120, keyed to the arbors 118, which are rotated by bevel-gearing 121, from the shaft 101, itself driven by chain 103. By the one tappet 120 the slide is moved in the one direction and by the other tappet in the opposite direction and according to the position of the projections 119 of the steel band relative to the position of the rollers the band is earlier or later actuated and moved through a greater or smaller angle, in consequence of which the pause at the end of its stroke is shorter or longer. The slide must always move through the same distance in order that its slots may come into the correct positions for being filled and emptied, so that the diameter of the guide-rollers must be selected to correspond with the angular movement of the steel band. The admission of the fuel is controlled, as in the preceding construction, by band 32, actuated from the regulator-shaft.

Figure 36:
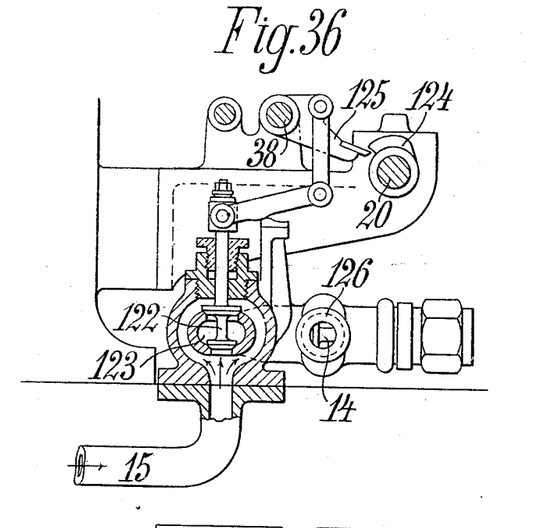
Figs. 36 and 37 are vertical and horizontal sections, respectively, of a modification of the device for regulating the compression.
Figure 37:
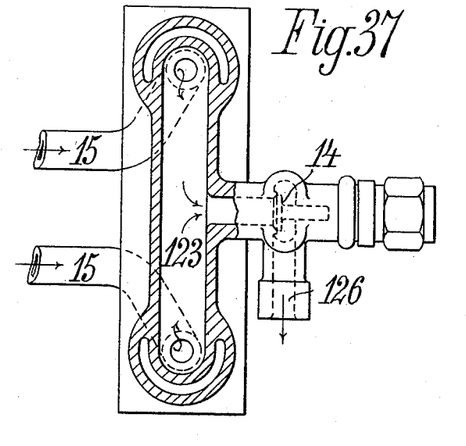

Instead of the rotary valve for regulating the compression may be used a cut-off device consisting of two balanced double-seat valves 122, Figs. 36, 37, seated in a duct 123, which connects both valve-casings, closing the pipes 15, and communicates with the valve 14. Both valves 122 are actuated from the valve-motion shaft 20 by cams 124 acting on levers 125 which are free to turn on shaft 38 and are connected with the valve-spindles. Cams 124 are of such length that valves 122 remain open during the compression to allow liquid to escape. When the scavengering-valve 9 is actuated by the mechanism 56 54 55, the cams 124 are close beside the tappets 54 55 on the valve-motion shaft. If, however, the scavengering-valve is opened automatically by the pressure of the blower, so that the actuating mechanism for this valve is not required, the cams 124 alone are present. The liquid which when changing the degree of compression must be removed as unnecessary and leaves by valve 14 and pipe 126, Figs. 2, 4, and 14, may, if necessary, be passed through a filter 127 or through a settling-tank. So, also, the pipe 8, Fig. 2, leading from the blower 4 to the casings of the scavengering-valves 9, may pass through a cooler 128.

Having thus described the nature of this invention and the best means I know of carrying the same into practical effect, I claim—

1. An internal-combustion engine comprising a horizontal cylinder with its working piston, a vertical extension at each end of said cylinder closed at the upper end and charged with liquid constituting liquid extensions of said piston, spaces in said cylinder extensions above the liquid for containing the explosive charges, means for introducing and exploding said charges alternately in each cylinder extension so that on the explosion of a charge in the one extension, the liquid will be forced downward therein, causing the piston to drive the liquid upward in the other extension, and to compress an explosive charge previously admitted therein, and means for discharging the combustion-gases from the cylinder extensions and for forcing in a charge of air under pressure after each explosion, substantially as described.

2. An internal-combustion motor comprising a horizontal working cylinder and its piston, the ends of the cylinder being formed into upwardly-extending chambers having closed coned upper ends and being partly filled with liquid that constitutes extensions of the piston, means for introducing combustible charges alternately into each chamber above the liquid, means for exploding such charges and thereby forcing downward the corresponding liquid column and causing the piston to perform its stroke to propel upward the other liquid column to compress an explosive charge previously admitted above it, means for introducing a scavenger charge of air into said chambers after each explosion for expelling the combustion-gases and supplying the air required for the next explosive charge, and means for discharging a portion of liquid from such chambers after each explosion and introducing a body of fresh liquid, substantially as described.

3. An internal-combustion motor comprising a horizontal working cylinder and its piston, the ends of the cylinder constituting upwardly-extending chambers having closed coned upper ends and containing liquid that constitutes extensions of the piston, means for introducing combustible charges alternately into each chamber, means for exploding such charges and thereby forcing downward the corresponding liquid column and raising the other liquid column, valve devices for discharging the products of combustion from and for admitting a scavenger charge of air into the space above the liquid column after each explosion, a forcing device for forcing an air-supply through said scavenger-valve device, a forcing device for forcing a fresh quantity of liquid into the liquid column after each explosion, and a valve device communicating with the lower part of the working cylinder for discharging a quantity of liquid from the liquid column when the compression-pressure exceeds a predetermined amount, substantially as described.

4. An internal-combustion motor comprising a horizontal working cylinder and its piston, upwardly-extending chambers at each end of the cylinder, charged with liquid forming extensions of the piston, means for the introduction of combustible matter for the combustible charges into the upper ends of said chambers, means for introducing air under pressure after each explosion for expelling the combustion-gases and supplying the air to mix with the combustible matter for forming the next explosive charge, a discharge-valve device for the escape of the combustion-gases, means for forcing liquid into the cylinder extensions after the explosion of a charge therein and means for allowing a controlled escape of the liquid therefrom during the upward motion of the liquid column in the one extension consequent on the explosion of a charge in the other extension, substantially as and for the purposes described.

5. An internal-combustion motor comprising a horizontal working cylinder and its piston, upwardly-extending chambers at each end of the cylinder having coned upper ends and charged with liquid forming extensions of the piston, means for the introduction of combustible matter into the coned ends of said chambers, a discharge-valve device for the combustion-gases at the upper end of each cylinder extension, a valve device for the admission of air under pressure into the upper part of each cylinder extension after the explosion of each combustible charge, means for forcing liquid into each cylinder extension after the explosion of a charge therein, a loaded escape-valve device, communicating with the lower end of each cylinder extension, and adapted to allow the escape of liquid therefrom when on the compression-stroke of the piston the compression-pressure exceeds the load on the valve, and a valve device adapted to close the said communication between the cylinder extensions and the loaded escape-valve at all times except during the compression-strokes of the piston, substantially as described.

6. An internal-combustion motor comprising a horizontal working cylinder and its piston, upwardly-extending closed chambers at each end of the cylinder charged with liquid, a valve device for the introduction of combustible matter into each cylinder extension, a valve device for the discharge of the combustion-gases after each explosion of a combustible charge, a valve device for the admission of air under pressure into each cylinder extension after each explosion for forming the next explosive charge, means for forcing liquid into each cylinder extension after each explosion, means for allowing the escape of liquid from each cylinder extension during the compression-stroke when the pressure exceeds a predetermined amount, and governor-controlled mechanism for varying the duration of the opening of the said discharge-valve according to variations in the load on the motor, substantially as and for the purpose described.

7. An internal-combustion motor comprising a horizontal working cylinder and its piston, upwardly-extending closed chambers at each end of the cylinder charged with liquid, a valve device for the introduction of combustible matter into each cylinder extension, a valve device for the discharge of the combustion-gases after each explosion of a combustible charge, a valve device for the admission of air under pressure into each cylinder extension after each explosion for forming the next explosive charge, means for forcing liquid into each cylinder extension after each explosion, means for allowing the escape of liquid from each cylinder extension during the compression-stroke when the pressure exceeds a predetermined amount, and governor-controlled mechanism for varying the duration of the opening of the said discharge-valve according to variations in the load on the motor and also to vary the time of opening and duration of opening of the said inlet-valve for combustible matter so that, on the one hand, it shall only open after the closing of the said discharge-valve, and on the other hand, the quantity of combustible matter shall vary according to variations in the load on the motor, substantially as described.

8. An internal-combustion motor comprising a horizontal working cylinder and its piston, upwardly-extending closed chambers at each end of the cylinder charged with liquid, a valve device for the introduction of combustible matter into each cylinder extension, a valve device for the discharge of the combustion-gases after each explosion of a combustible charge, a valve device for the admission of air under pressure into each cylinder extension after each explosion for forming the next explosive charge, means for forcing liquid into each cylinder extension after each explosion, means for allowing the escape of liquid from each cylinder extension during the compression-stroke when the pressure exceeds a predetermined amount, and governor-controlled means for varying the quantity of liquid forced into the cylinder extensions after the explosion of each charge, according to variations in the load on the motor, substantially as described.

9. An internal-combustion motor comprising a horizontal working cylinder and its piston, upwardly-extending chambers at each end of the cylinder charged with liquid and having closed upper ends, each provided with a valve device for the introduction of combustible matter, a valve device for the discharge of the combustion-gases after each explosion of a combustible charge, a valve device for the admission of air under pressure into each cylinder extension after each explosion for forming the next explosive charge, means for forcing liquid into each cylinder extension after each explosion, means for allowing the escape of liquid from each extension during the compression-stroke when the compression-pressure exceeds a predetermined amount, a governor, controlling mechanism connecting the said discharge-valve, the inlet-valves for compressed air, and fuel, and the device for forcing liquid into the cylinder extensions with the engine-governor, so as, according to variations in the load of the motor, to vary the duration of the opening of the discharge-valve, to vary the quantity of air remaining in the cylinder extensions after the closing of the discharge-valve, to vary the time and duration of the opening of the valve device for the admission of combustible matter, and to vary the amount of liquid admitted to the cylinder extensions after each explosion for the purpose of varying the volume of the combustible charges according to the varying load on the motor, while maintaining the composition of such charges and the degree to which they are compressed constant, substantially as described.

10. An internal-combustion motor comprising a working cylinder open at both ends, each end being in a separate chamber, which chamber is filled with liquid and terminates above in an upwardly-coned explosion-chamber, the said explosion-chamber being fitted with a device for injecting combustible matter, a scavengering-valve for the introduction of air under pressure, a valve for the discharge of combustion-gases, and an igniting device; pumps for supplying the compressed air and the said liquid; and a valve for allowing liquid to flow from either cylinder-chamber, the said valve being loaded so that only when compression of the explosive charges exceeds a predetermined pressure it will allow the escape of liquid, substantially as and for the purpose described.

11. An internal-combustion motor comprising a working cylinder open at both ends, each end being in a separate chamber, which chamber is filled with liquid and terminates above in an upwardly-coned explosion-chamber, the said explosion-chamber being fitted with a device for injecting combustible matter, a scavengering-valve for the introduction of air under pressure, a valve for the discharge of combustion-gases, and an igniting device; pumps for supplying the compressed air and the said liquid; and a valve for allowing liquid to flow from either cylinder-chamber, and a regulating mechanism for causing the combustible matter to be introduced immediately after the closure of the discharge-valve, consisting of a lever 58, toothed wheelwork 57, 59, 60, 61, turned by the valve-motion shaft 20 and a casing 62 capable of rotation with respect to the lever 58, the nave of which casing runs free on the valve-motion shaft and carries tappets 40, 41, in whose paths are the bell-cranks 39 that actuate the mechanism for introducing the combustible matter, the said lever 58 being connected with a lever 67 actuated by the governor so that when during the rotation of the valve-motion shaft the toothed wheelwork is turned backward by the governor through the lever 58, the tappets 40, 41, actuate the levers 39 somewhat later, substantially as described.

12. An internal-combustion motor comprising a working cylinder open at both ends, each end being in a separate chamber, which chamber is filled with liquid and terminates above in an upwardly-coned explosion-chamber, the said explosion-chamber being fitted with a device for injecting combustible matter, a scavengering-valve for the introduction of air under pressure, a valve for the discharge of combustion-gases, and an igniting device; pumps for supplying the compressed air and the said liquid; and a valve for allowing liquid to flow from either cylinder-chamber, and a device for regulating the compression of the explosive charges consisting of a rotary valve 13 combined with a loaded valve 14, for the escape of liquid, which rotary valve is actuated by the valve-motion shaft in such manner that the valve 14 is put in communication with that explosion-chamber in which a charge is being compressed, the said rotary valve receiving this motion through the levers 56 which open the scavengering-valve 9 and through telescopic rods 69, 70, carrying collars 71, 72, and connected with cranks on the spindle of the rotary valve so that the latter is alternately moved into the position in which it allows liquid to flow from the one cylinder or the other through the valve 14, substantially as described.

13. An internal-combustion motor comprising a working cylinder open at both ends, each end being in a separate chamber, which chamber is filled with liquid and terminates above in an upwardly-coned explosion-chamber, the said explosion-chamber being fitted with a device for injecting combustible matter, a scavengering-valve for the introduction of air under pressure, a valve for the discharge of combustion-gases, and an igniting device; pumps for supplying the compressed air and the said liquid; and a valve for allowing liquid to flow from either cylinder-chamber, and a starting-gear consisting of a compressed-air pipe and a three-way cock 74 making communication between the said air-pipe and one or other side of the working cylinder, the said cock being turned by the engagement of a coupling 87, 88, at the same time that the cut-off cock 77 of the compressed-air pipe is turned, in order that compressed air may flow into one or the other of the explosion-chambers, substantially as described.

14. An internal-combustion motor comprising a horizontal working cylinder and its piston, an upwardly-extending chamber at each end of the cylinder charged with liquid that constitutes extensions of the piston, means to blow an explosive charge into the extensions above the liquid-level therein, a discharge-valve and a valve controlling the admission of compressed air in each extension, a pump operated by the motor to force liquid into each extension after each explosion, means to vent liquid from the bottom of each chamber, a compressor connected to the piston to send scavengering air under pressure into the extensions, valve mechanism controlling compressed air to start the motor, and an independent compressor operated by the motor to supply air to the cylinder extensions through the starting mechanism, substantially as described.

15. An internal-combustion motor comprising a horizontal working cylinder and its piston, chambers at each end of the cylinder charged with liquid that constitutes extensions of the piston, means to blow an explosive charge into the extensions above the liquid-level therein, a loaded discharge-valve and a valve controlling the admission of compressed air into each extension, a pump operated by the motor to force liquid into each extension after each explosion, means to vent liquid from the bottom of each chamber, a valve to control the venting of fluid from the chambers, means to send scavengering air under pressure into the extensions, a valve-motion shaft, means thereon to actuate the feed of the charge, devices thereon to actuate the discharge-valves, devices thereon to actuate the valves controlling scavengering air and simultaneously operate the valve venting liquid from the chambers, a governor, and a shaft controlled thereby and connections between said shaft and means to blow in the charge to control the introduction thereof, and auxiliary means connected to said shaft to control the operation of the exhaust-valves, substantially as described.

16. An internal-combustion engine comprising a horizontal cylinder with its working piston, an extension at each end of the cylinder charged with liquid that constitutes liquid extensions of the piston, means for introducing and exploding explosive charges alternately in said chambers above the liquid-level therein, means for discharging the combustion-gases, means to force in a charge of air under pressure after each explosion, a rotatable starting-valve controlling air under pressure to admit said air alternately to the chambers and hand-operated clutch mechanism to engage a rotating element to actuate the valve, substantially as described.

17. An internal-combustion engine comprising a horizontal cylinder with its working piston, an extension at each end of the cylinder charged with liquid that constitutes liquid extensions of the piston, means for introducing and exploding explosive charges alternately in said chambers above the liquid-level therein, means to discharge the combustion-gases, means to force in a charge of air under pressure after each explosion, a driven valve-motion shaft, a gear-wheel loose thereon, a clutch-sleeve on the shaft to engage said wheel, a rotatable starting-valve controlling air under pressure, a gear-wheel on the valve meshing with that on the valve-motion shaft, substantially as described.

18. An internal-combustion motor, comprising a horizontal cylinder with its working piston, an extension at each end of the cylinder charged with liquid that constitutes liquid extensions of the piston, a pulverulent fuel-container on each extension, a fuel-injector, a fuel-feed to deliver a determined quantity of fuel from the container to the injector to be blown into the chambers above the liquid-level therein, means to discharge the combustion-gases therefrom, means to force in a charge of air under pressure after each explosion and a valve-motion shaft to actuate the fuel-feed, a governor-controlled shaft, and means connected thereto to vary the quantity of fuel fed to the fuel-feeding device, substantially as described.

In testimony whereof we have hereunto set our hands in presence of two subscribing witnesses.

ADOLF VOGT.
MAX VON RECKLINGHAUSEN.

Witnesses to the signature of Adolf Vogt:
EDWARD GARDNER,
WALTER J. SKERTEN.

Witnesses to the signature of Max von Recklinghausen:
WILLIAM H. CAPEL,
G. E. CHAPIN.